INVENTOR.
CHARLES M. PERKINS
BY
Woodhams, Blanchard & Flynn
ATTORNEYS

INVENTOR.
CHARLES M. PERKINS
BY
Woodhams, Blanchard & Flynn
ATTORNEYS

Oct. 1, 1963

C. M. PERKINS 3,105,395

AUTOMOTIVE DEVICE

Filed Dec. 26, 1962

INVENTOR.
CHARLES M. PERKINS
BY
Woodhams, Blanchard & Flynn
ATTORNEYS

Oct. 1, 1963  C. M. PERKINS  3,105,395
AUTOMOTIVE DEVICE

Filed Dec. 26, 1962  5 Sheets-Sheet 5

INVENTOR.
CHARLES M. PERKINS
BY
Woodhams, Blanchard & Flynn
ATTORNEYS

United States Patent Office 3,105,395
Patented Oct. 1, 1963

3,105,395
AUTOMOTIVE DEVICE
Charles M. Perkins, Oshtemo Township, Kalamazoo County, Mich., assignor to Eaton Manufacturing Company, Cleveland, Ohio, a corporation of Ohio
Filed Dec. 26, 1962, Ser. No. 247,797
33 Claims. (Cl. 74—745)

This invention relates to transmissions and it particularly relates to a multicountershaft transmission wherein means are provided for ensuring an even distribution of torque on each of said countershafts. This application is a continuation-in-part of patent application Serial No. 51,010, filed August 22, 1960, and entitled Automotive Device, now abandoned.

In the design of transmissions, particularly heavy-duty transmissions of the automotive type, there has existed for a long time the problem of handling and providing room for the very large gears which are essential in single-countershaft transmissions for delivering high torque. As the transmissions are designed for progressively higher loads, they necessarily become progressively larger and this requires correspondingly larger components.

More particularly, it has long been recognized by transmission engineers that the life of the gears is an exponential function of the stress applied thereto. One commonly used formula expressing this relationship is: Life=Stress$^{-6.7}$. Thus, if the stress on a given gear can be reduced by a given amount, the effect on the life of that gear will be an exponential function of such amount.

However, in applying this approach to a conventional transmission, a reduction in stress can be obtained only by reducing torque, or by increasing the size of the gears. The first is self-defeating if the transmission is to carry a given torque and the second introduces other problems of space requirements and cost, together with difficulties in handling the parts in both the manufacturing and the maintenance of a transmission having such larger gears.

It has been in the past suggested to remedy these and other difficulties incident to the increase in size of the components of transmissions, by utilizing multicountershaft transmissions in which a given load may be transmitted through pairs of countershaft gears rather than through a single-countershaft gear. By so doing, the load carried by each of the countershaft gears is diminished by at least one-half, or more if more than two countershafts are used. Thus, even though diminishing the radius of a gear carrying a given torque will increase the stress to which it is subjected, the diminishing of the load by one-half or more in the manner indicated is sufficient to permit an appreciable reduction in the radius of said gears while still retaining a useful reduction in the stress to which each is subjected. Since the effect on gear life of a reduction in stress is exponential, even a small reduction in stress produces appreciable benefits in extension of gear life.

Of course, many combinations of these variables are possible. For example, if gear life is maintained constant, even greater reduction in gear size is possible. Actual designing along this line has resulted in a transmission which is smaller in both height and width than a conventional single countershaft transmission even though the capacity and the stress on the gears remained the same.

Therefore, the use of at least two countershafts has many advantages and these advantages have been recognized for a long time by those skilled in the art.

However, when a multicountershaft transmission is provided, this creates a further problem which is not present in a single-countershaft transmission; namely, the problem of ensuring that the several countershafts carry equal torques. It is self-evident that if the torques are not evenly divided between the countershafts, the whole purpose of having multiple countershafts is defeated.

Many designs have been proposed for meeting this problem and particularly for ensuring the uniform location of a plurality of countershafts with respect to each other and with respect to a transmission main shaft. However, since the pressure exerted between the teeth of the several gears involved can be drastically changed by even extremely minute variations in the respective relationships and positions of the main shaft, the countershafts and the gears thereon, it has in the past been virtually impossible to effect and maintain at an acceptable cost a sufficiently accurate positioning and balancing of the parts so as to provide even reasonable assurance of the uniform distribution of torque between plural countershafts.

In working with this problem I have discovered that if the main shaft of the transmission is placed between a pair of countershafts and is permitted to float, it will seek its own balance and automatically adjust itself so that the load is equally divided between the countershafts, or at least sufficiently so to be within acceptable limits.

With such an arrangement, as the gears rotate during the operation of the transmission, the capacity of the main shaft for self-adjustment will enable it to follow any cyclic variations in the torque-transmitting elements between the input shaft and the main shaft, so as to maintain the power divided equally between the countershafts at all times during the operation of the apparatus. Such cyclic variations may, by way of example, be variations in the thickness of the teeth in one or more of the gears or they may be variations in the positioning of the respective keys and keyways by which the gears are affixed to their respectively associated shafts. Thus, suitable compensation will be made for the inevitable variations in the manufacture of a given unit and excessive loading, even though only momentary, on either of the countershafts will be avoided.

A further advantage of this construction arises from the fact that by supporting the driven gear on both sides thereof, resulting from its engagement on diametrically opposite sides by corresponding gears of the two countershafts, it becomes unnecessary to support said main shaft by a forward bearing. Said bearings are usually piloted within the input shaft and are therefore necessarily small and somewhat inaccessible. This has several disadvantages among which are the difficulty of lubricating the bearing adequately by other than pressure lubrication means and the rather limited load which can safely be placed on the bearing. By the apparatus of the invention, such a bearing is eliminated, and instead the gearing is relatively open and is adequately lubricated merely by common splash lubrication.

Accordingly, the objects of the invention are:

(1) To provide a heavy-duty transmission gearing system having more favorable size, capacity and life-expectancy relationships than that which has previously been available.

(2) To provide a heavy-duty transmission gearing in a system by which the size of the transmission can be reduced while increasing the load which the transmission is capable of carrying.

(3) To provide a heavy-duty transmission gearing system, as aforesaid, in which the usual large gears can be eliminated and replaced by gearing of much smaller size for a given torque transmission capacity.

(4) To provide a heavy-duty transmission gearing system, as aforesaid, utilizing at least two countershafts wherein the power is divided equally therebetween.

(5) To provide a heavy-duty transmission, as aforesaid, which is capable of automatically and continuously dividing the power equally between at least two countershafts whereby to compensate for manufacturing irregularities in the apparatus.

(6) To provide a heavy-duty transmission system, as aforesaid, wherein the driven gearing is positively supported by gearing on opposite sides thereof and thereby eliminates the lateral forces applied to driven gearing in conventional single-countershaft transmissions.

(7) To provide a heavy-duty transmission system, as aforesaid, wherein the usual front and pilot bearings conventionally used with the driven shaft can be eliminated and wherein all of the gearing can be adequately lubricated by splash lubrication.

(8) To provide a heavy-duty transmission system, as aforesaid, wherein the two countershafts and gears associated therewith will be identical with each other (other than in some instances in the position of a keyway or other locating devices for the countershaft gears on the countershaft) and thereby effect a system of maximum simplicity in both manufacture, inventorying of parts, and in assembly.

(9) To provide a heavy-duty transmission system, as aforesaid, which can be embodied in transmission parts which are strong and sturdy, which are free from parts requiring delicate adjustment, whose parts will be easily accessible for inspection and/or repair when needed, all toward the end of providing a long period of satisfactory and effective operation at relatively low cost.

Further objects and purposes of the invention will be apparent to persons acquainted with apparatus of this general type upon reading the following disclosure and inspecting of the accompanying drawings.

While the broader aspects of the principles above set forth are applicable to arrangements involving more than two countershafts, the most practical commercial arrangement appears at present to embody two countershafts. Accordingly, the specific embodiment hereinafter described employs only two countershafts and the description will for convenience be set forth in such terms.

*General Description*

In general the invention comprises providing at least two countershafts, and arranging same at equally spaced intervals around axially aligned input and output shafts. Pairs of countershaft gears are arranged respectively opposite each other on said countershafts and the main shaft gears are each respectively supported between and by a pair of said countershaft gears. A main shaft extends through said main shaft gears and is selectively clutchable to one thereof at a time for both rotative and radial movement therewith. The means supporting the main shaft is supported with respect to the transmission casing by means, preferably resilient, which permit sufficient movement thereof with respect to said casing to enable said main shaft gears to adjust themselves radially according to the requirements of balancing torque between the countershafts. Further, said main shaft is related to the output shaft of the transmission so as to permit such compensating movement.

*Detailed Description*

Figure 2:
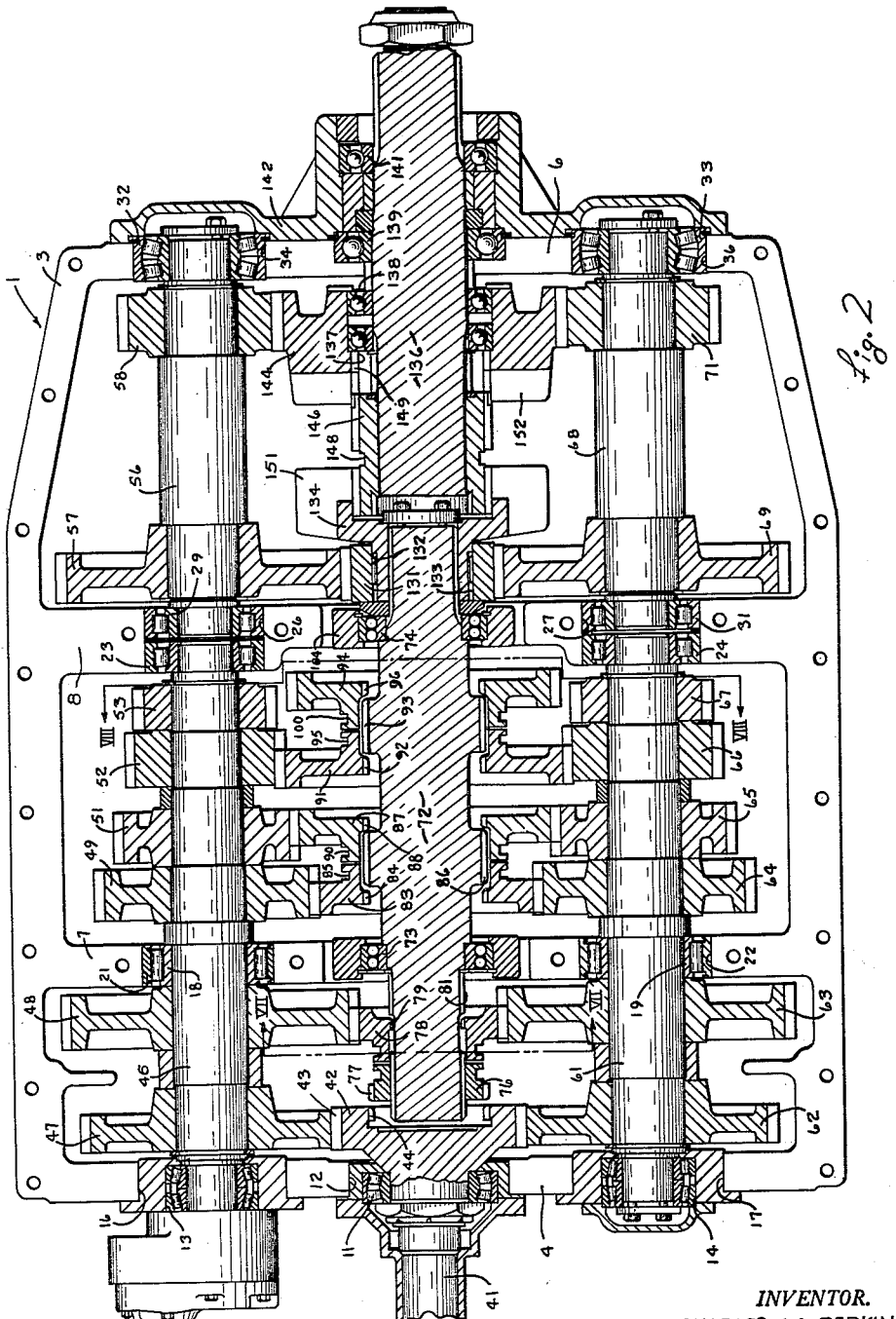
FIGURE 2 is a section taken on the line II—II of FIGURE 1 showing the horizontal central section of a transmission embodying the invention.
Figure 3:
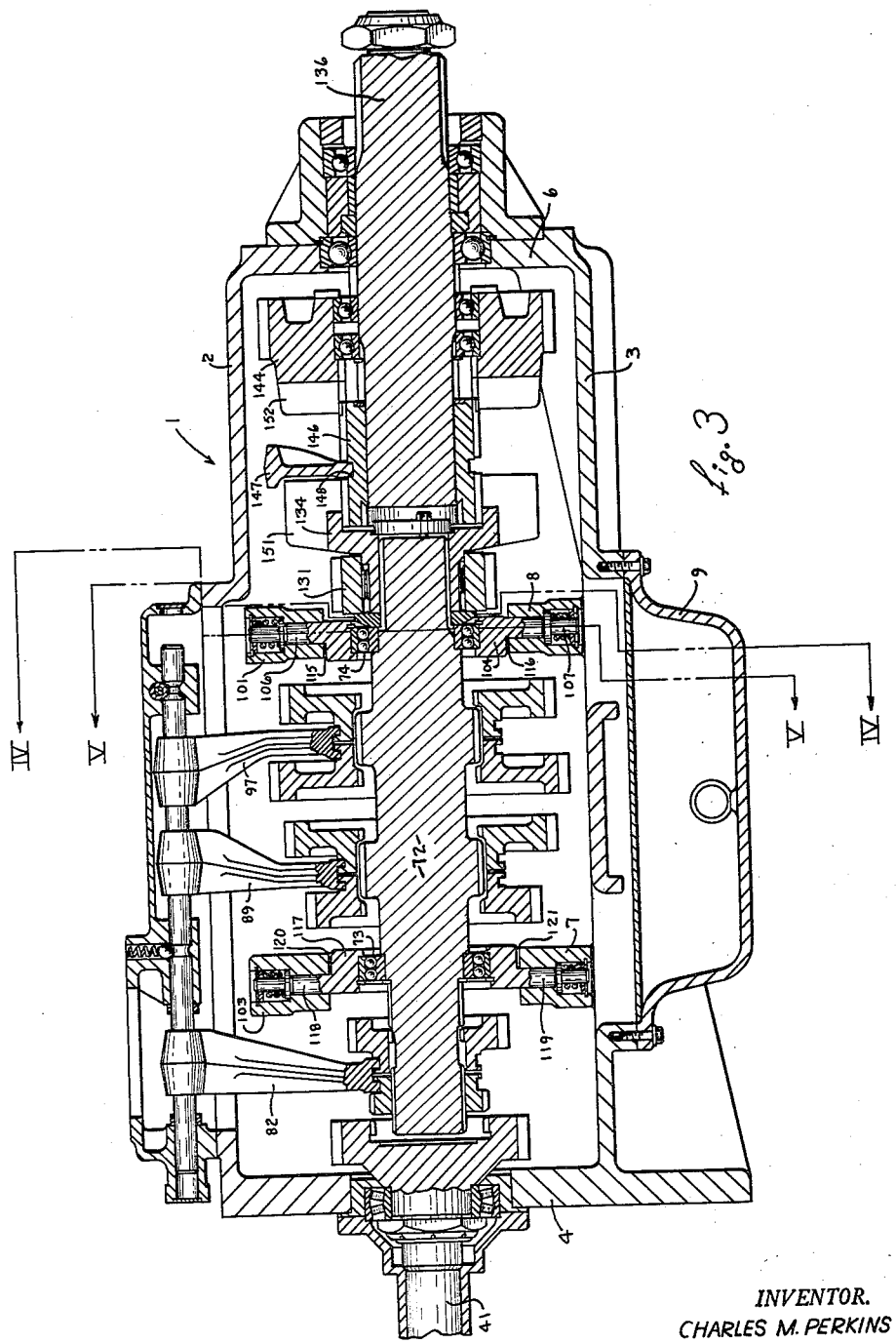
FIGURE 3 is a section taken on the line III—III of FIGURE 1 and showing a vertical central section of a transmission embodying the invention.
Figure 4:
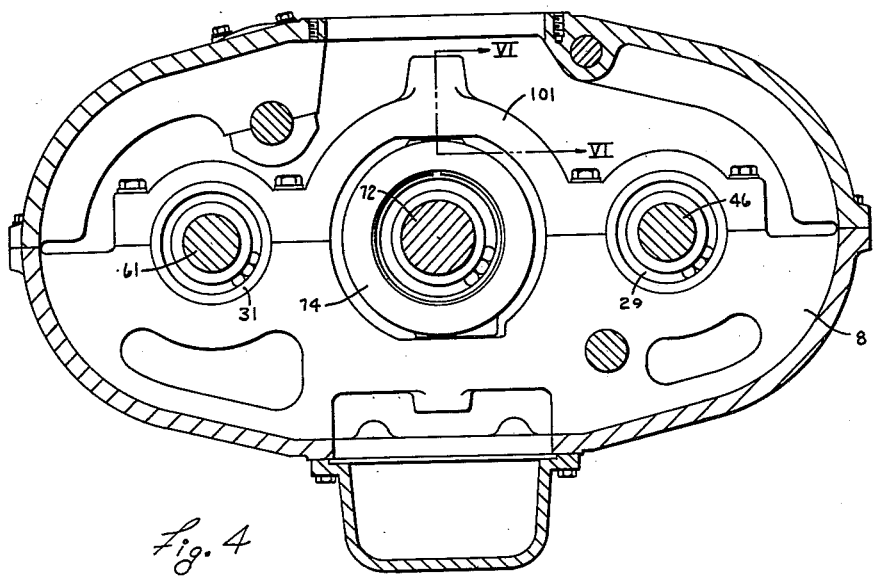
FIGURE 4 is a section taken on the line IV—IV of FIGURE 3.

In the following description certain terminology will be used for convenience of reference but it will be understood that such terminology will be for convenience only and has no limiting significance. For example, the terms "forward" and "rearward" will refer to directions forward and rearward of the vehicle in which the transmission is installed. Thus, the leftward portion as appearing in FIGURES 2 and 3 is forward and the rightward portion of the transmission as appearing in said figures is rearward. The terms "rightward" and "leftward" will refer to directions as taken in the drawings in connection with which said terminology is used. The terms "inward" and "outward" will refer to directions toward and away from the geometric center of the apparatus. All terms mentioned foregoing include all normal derivatives and equivalents of each thereof.

Referring now to the drawings there is provided a casing 1 which is horizontally split into upper and lower portions 2 and 3, respectively. Said lower portion 3 has a forward end wall 4 and a rearward end wall 6. Said lower portion also has a forward intermediate wall 7 and a rearward intermediate wall 8. A suitable, depending, oil sump 9 may be provided, if desired.

Each of said walls is provided with recesses for the reception of the various shaft bearings. The input shaft bearing 11 is supported by a suitable recess 12 in the wall 4. The countershaft bearings 13 and 14 are supported in suitable recesses 16 and 17, respectively, in said forward end wall 4. Countershaft bearings 18 and 19 are supported in recesses 21 and 22, respectively, in the forward intermediate wall 7 and countershaft bearings 23 and 24 are supported in recesses 26 and 27 in the rearward intermediate wall 8. The bearings 29 and 31 which support the forward ends of the auxiliary countershafts hereinafter described, are also supported in the recesses 26 and 27, respectively. Bearings 32 and 33 for supporting the rearward ends of said auxiliary countershafts are received within recesses 34 and 36, respectively, in the rearward wall 6 of the transmission housing 1.

It will be recognized that, while the present construction provides both the auxiliary and the main shaft assemblies in a single casing, this is a design detail and is here employed as a matter of convenience. Said main and auxiliary shaft assemblies may, of course, be in separate casings and their presentation here as a single casing is for illustrative purposes only and is not limiting.

An input shaft 41 is supported in the bearing 11 and has a drive gear 42 formed on the rearward end thereof. Said drive gear has external teeth 43 and internal clutch teeth 44. A first main countershaft 46 is supported by the bearings 13, 18 and 23 and carries thereon and fixed for rotation therewith the countershaft ratio gears 47, 48, 49, 51, 52 and 53. An auxiliary countershaft 56 is supported on the bearings 29 and 32 here coaxial with the first main countershaft 46, and carries gears 57 and 58 rigidly affixed thereto for rotation therewith.

A second main countershaft 61 is supported within the bearings 14, 19 and 24 and is in all respects preferably identical with the first main countershaft 46. Second countershaft ratio gears 62–67 are mounted on and for rotation with the second countershaft 61 and are preferably respectively identical with the ratio gears 47, 48, 49, 51, 52 and 53. A second auxiliary countershaft 68 coaxial with the second main countershaft 61 is supported within the bearings 31 and 33 and carries gears 69 and 71 rigidly affixed thereon for rotation therewith, said gears preferably being respectively identical with the gears 57 and 58.

The main transmission shaft 72 is arranged substantially coaxial with the input shaft 41 and is supported on bearings 73 and 74 which in turn are resiliently supported as hereinafter described in further detail. Gears are provided on the main shaft for engagement with the countershaft gears and said countershaft gears and/or said main shaft gears are appropriately clutched, to each other or to their respective shafts, in any convenient manner to provide driving connections from the two countershafts through a selected pair of countershaft gears to and through the main shaft gear associated therewith to the main shaft. The particular method of clutching hereinafter described will thus be recognized as illustrative only and not limiting.

In this particular embodiment, the main shaft gear 76 is slidingly mounted on splines on the forward end of said main shaft 72 and carries clutch teeth 77 which are engageable with the clutch teeth 44 upon leftward movement of said gear 76. The gear 78 is meshed with and carried by the countershaft gears 48 and 63, and is provided with internal clutch teeth 79 for engagement with splines 81 on the main shaft. Said gears 76 and 78 are provided with any suitable means for effecting axial movement thereof, such as by the usual grooves and a shift fork 82 (FIGURE 3).

Figure 8:
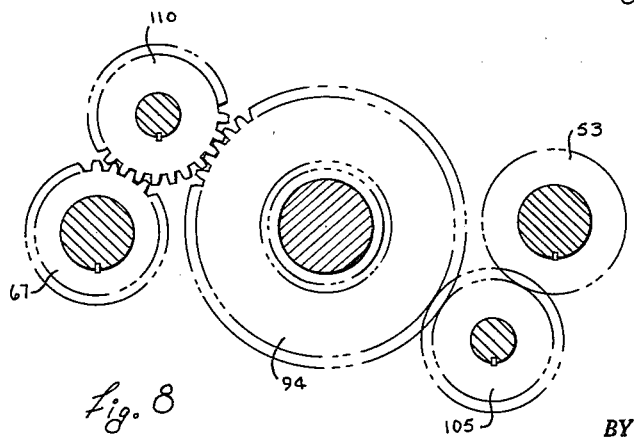
FIGURE 8 is a section taken on the line VIII—VIII of FIGURE 2 for showing the reverse-gearing mechanism.

The main shaft gear 83 is supported between and by the countershaft gears 49 and 64 and has a set of internal clutch teeth 84 for engagement with the external splines 86 of the main shaft. The gear 87 is supported between and by the countershaft gears 51 and 65 and is provided with internal clutch teeth 88 for engagement with the main shaft splines 86. Said gears 83 and 87 are axially slidable for alternate but only alternate engagement of said splines 86 and such axial movement is effected in any convenient manner, such as by a shift fork 89 (FIGURE 3) acting in the grooves 85 and 90. The main shaft gear 91 is supported between and by the countershaft gears 52 and 66 and is provided with internal clutch teeth 92 for engagement of the main shaft splines 93. The main shaft gear 94 is supported on and between the usual reverse idler gears 105 and 110 (FIGURE 8) which are in turn engaged with the gears 53 and 67. The gear 94 has internal clutch teeth 96 for engagement with the splines 93 alternately with the internal clutch teeth 92. The gears 91 and 94 are arranged for axial movement by any convenient means, such as by a shift fork 97 (FIGURE 3) acting in the grooves 95 and 100.

Each of said gears 78, 83, 87, 91 and 94, together with gear 76, may be collectively termed "main shaft gears," since they all are capable of drivingly engaging the main shaft. However, it is emphasized that, excepting for gear 76, they are all supported on and by the countershaft gears and they merely surround and at times engage the main shaft but are not supported on or by the main shaft. Rather, as will be further developed later, the main shaft will move both rotatively and radially with that one of the main shaft gears to which it may be clutched at a particular moment, as brought out further hereinafter.

It will be observed by inspection of FIGURE 2 that each of the main shaft gears is constantly engaged with the countershaft gears upon which it is supported in all of its axial positions. Accordingly, engagement or disengagement of a given main shaft gear with the main shaft will not affect its relationship with the countershaft gears upon and by which it is supported.

Figure 5:
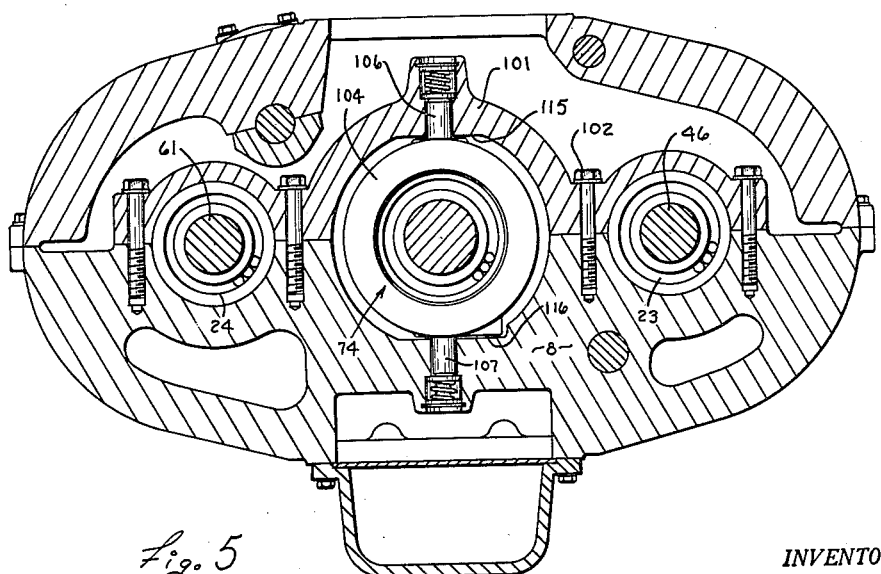
FIGURE 5 is a section taken on the line V—V of FIGURE 3.

A cap structure 101 is arranged above the rearward intermediate wall 8 for engaging the several bearings supported within said wall and for holding said bearings in place. Said cap structure 101 is fastened in any convenient manner, such as by screws of which one is indicated at 102 (FIGURE 5). A similar cap structure 103 (FIGURE 3) is provided for the forward intermediate wall 7.

Turning now to the means by which the main shaft bearings 73 and 74 are supported, attention is directed first to FIGURE 5. Here the bearing 74 is supported in a casing 104 from which extend pins 106 and 107. Said pins are preferably coaxial with respect to the bearing 74 and aligned perpendicularly with respect to the common plane between the axes of the countershafts 46 and 61.

Figure 6:
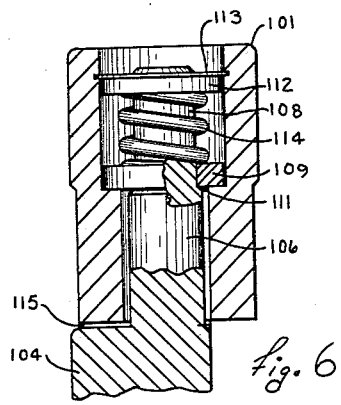
FIGURE 6 is a fragmentary section taken on the line VI—VI of FIGURE 4.

Said pins are resiliently supported in any convenient manner on and with respect to the frame structure of the transmission to permit limited movement of the main shaft in a direction parallel with the axes of said pins. In the particular embodiment here illustrated (FIGURE 6), the pin 106 is provided with a portion 108 of reduced diameter and carries a washer 109 on the shoulder 111 provided by such reduction in diameter. A thrust washer 112 is provided adjacent the end of said pin 106 and is held by a snap ring 113 against movement with respect to the cap structure 101. The spring 114 is arranged between the washers 109 and 112.

Similar structure is provided for cooperation with the pin 107 (FIGURE 5). Thus, the casing 104 and bearings and main shaft carried thereby is normally centered, or substantially centered by said springs so that its axis lies in the plane including the axes of said countershafts but it can move against said springs a desired distance in either direction perpendicular to said plane.

In this embodiment, such distance is limited by the spacing 115 between the casing 104 and the adjacent surfaces of the cap 101. A similar limit is provided by the spacing 116 between the lower surface of the casing 104 and the adjacent upper surface of the rearward intermediate wall 8. However, these limits are placed well beyond the normal range of movement of said main shaft and hence will not interfere with the free floating movement of the main shaft as described. Quantitatively, the main shaft in such floating movement seldom moves more than a few thousandths of an inch in either direction from its center position so that placement of said limits at about one-sixteenth of an inch from the centered position of the limited part will in most cases be ample.

The bearing 73 is carried in a casing 117 (FIGURE 3) which is similarly mounted on pins 118 and 119 which pins are carried in the cap 103 on the forward intermediate wall 7 in a manner respectively similar to the pin 106 in the cap 101 and the pin 107 in the rearward intermediate wall 8. The distance which said casing 117 can move upwardly and downwardly is similarly limited to that provided by the spacings 120 and 121 existing between the upper and the lower surfaces of the casing 117 and the respectively adjacent surfaces of the cap 103 and forward intermediate wall 7.

The auxiliary portion of the transmission comprises a primary auxiliary input gear 131 which is supported on and between the auxiliary countershaft gears 57 and 69, and which has internal splines 132 interengaged with the external splines 133 on the forward end of a secondary auxiliary input driver 134, which in turn is supported on and by, and splined for rotation with, the rearward end of the main shaft 72.

The driver 134 and the shaft 72 on which it is carried are splined together snugly and over sufficient length that they will remain coaxial under all conditions of operation. However, the splining relationship between the gear 131 and the driver 134 is such that the driver 134 can rock with respect to the gear 131 whereby the axis of the driver 134 can move angularly with respect to the axis of the gear 131. The radially outward surfaces of the secondary auxiliary input gear splines 133 are relieved, particularly at their ends, sufficiently for this purpose.

Figure 1:
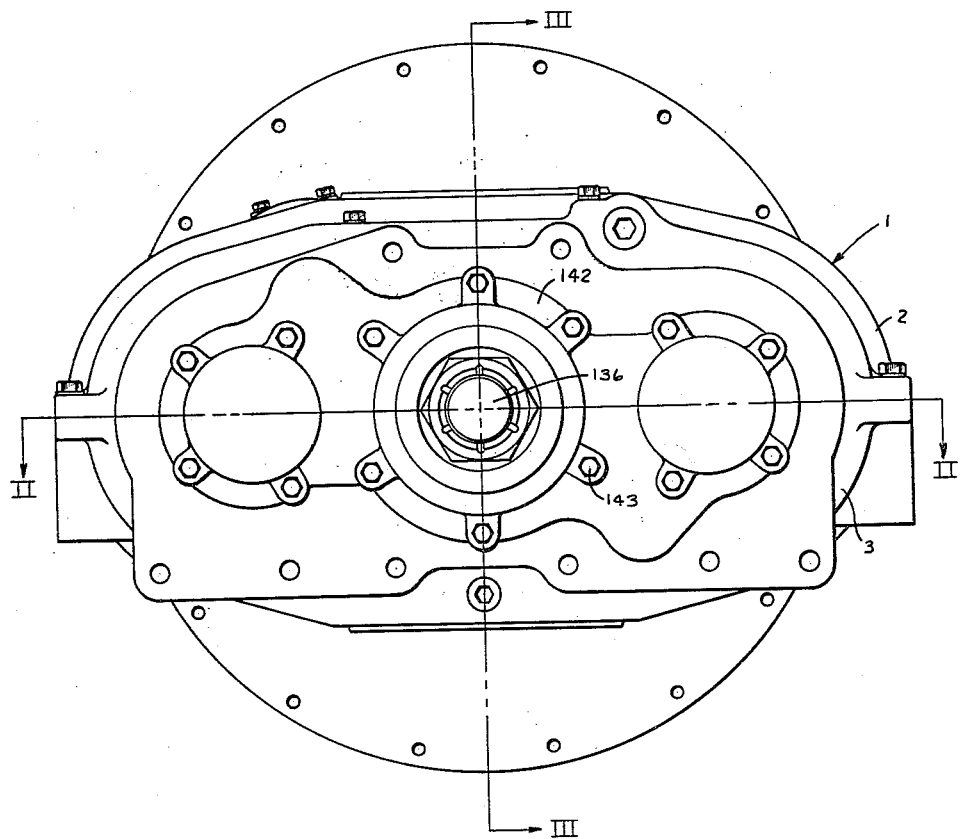
FIGURE 1 is a rear-end view of a transmission embodying the invention.

The auxiliary main shaft 136 is rotatably supported by bearings 137 and 138 and by the bearings 139 and 141 which bearings hold said shaft 136 firmly against radial or rocking movement. Said bearings 139 and 141 are supported in a rearward end cap 142 which in turn is fastened in any convenient manner, such as by suitable screws of which one appears at 143 (FIGURE 1), onto the rearward end of the transmission housing 1. The bearings 137 and 138 support a gear 144, said gear being located between the auxiliary countershaft gears 58 and 71. A slider 146 is splined onto the auxiliary shaft 136 and is axially movable by any convenient means, such as the shift fork 147 (FIGURE 3) acting in a suitable groove, such as the groove 148. Said slider 146 is alternately engageable with internal dog clutch teeth within the driver 134 or with the internal dog clutch teeth 149 within the gear 144.

The rearward end of the shaft 136 is connected as desired to any convenient means for receiving power delivered from and by said transmission.

Any convenient synchronizer, or blocking rings, will preferably be provided between the slider 146 and the dog clutch teeth engaged thereby. Said synchronizers are indicated only generally at 151 and 152.

Synchronizers or blocking rings can, if desired, be provided between the interengageable teeth associated with the main shaft 72. However, in the particular embodiment here illustrated, the ratios in the main gear set and those in the auxiliary gear set are as set forth in the patent to Ludvigsen and Backus, No. 2,637,221, and the use of synchronizers in the main gear set is accordingly unnecessary.

Operation

The operation of the apparatus has been somewhat indicated previously but will be reviewed fully to ensure a clear understanding of the invention.

Input power from the shaft 41 is supplied to the input gear 42 and is thence delivered to the countershafts 46 and 61. By suitable manipulation of one of the shift forks 82, 89 and 97, one of the main shaft gears connected thereto is engaged with the main shaft, such as the gear 78, and the power is then conducted from the two countershafts through such gear to the main shaft 72. The power then travels through the main shaft 72 to the auxiliary driver 134. In the direct drive setting of said auxiliary, the power is delivered from the auxiliary input driver 134 directly through the shaft 136 to the output connection of the transmission. In the reduction setting of the auxiliary transmission, the power goes from the auxiliary input driver 134 through the gear 131 to the gears 57 and 69, thence through the auxiliary countershafts 56 and 68, the gears 58 and 71 to the auxiliary main shaft 136 and finally to the output of the transmission.

Turning now to the relationship between the floating main shaft of the transmission and the countershafts it will be emphasized first that the main shaft has no bearing relationship with the several main shaft gears but is only clutched to such thereof as is desired to be brought into the power train. However, the main shaft gear which in any given instance is clutched with the main shaft will engage same uniformly around the entire circumference of said main shaft and thereby hold it centered in and with respect to said gear. Therefore, since the bearings 73 and 74 are resiliently mounted to permit vertical movement of the main shaft, any main shaft gear which is clutched to the main shaft will carry the main shaft with it if and as it moves upwardly or downwardly between the auxiliary countershaft gears with which said clutched main shaft gear is engaged.

The main shaft gears themselves will in their initial assembly be positioned between the countershaft gears associated therewith in such position that their axes are at least approximately in the common plane joining the axes of the countershaft gears. Then, as the given pair of countershaft gears rotate, the main shaft gear associated therewith will normally remain centered inasmuch as its tendency to move off of said center in one direction in response to one countershaft gear is counterbalanced by an equal tendency to move in the opposite direction in response to the opposite countershaft gear. In effect, a balanced couple is created by the equal and oppositely directed forces applied to the opposite sides of the main shaft gear. This will be effective inasmuch as both of said countershafts are rigidly locked to a single input shaft and said countershafts are through said clutched main shaft gear also rigidly locked to a single output shaft.

However, if one countershaft gear, which for example may be taken as the countershaft gear 48, is irregular in shape, either within itself or as compared to the opposite countershaft gear, it may, if no compensating adjustment is made, tend to develop more pressure due to such irregularity on the associated main shaft gear 78 in an upward direction than is counterbalanced by the downwardly acting pressure from gear 63. In such case, the load torque L on the main shaft gear 78 will move said main shaft gear 78 in a direction opposite to the direction in which it is being driven and thereby restore the balance between the said main shaft gear and the countershaft gears connected thereto. This may be best illustrated by reference to FIGURE 7 wherein there appears a fragment of gear 48, a schematic indication of gear 78, and a fragment of gear 63. The solid line arrows indicate the direction of rotation of each of said gears. The tendency for an increasing pressure between gear 48 and the main shaft gear 78 is indicated by the solid contact between the respectively engaged gear teeth at 161 and the tendency for a lessening pressure between interengaged teeth of gear 78 and auxiliary shaft gear 63 is indicated by the space 162 between adjacent teeth of said last-named gears. The broken line L indicates the load torque which is applied to the mainshaft gear 78 by the load which said gear is driving.

Figure 7:
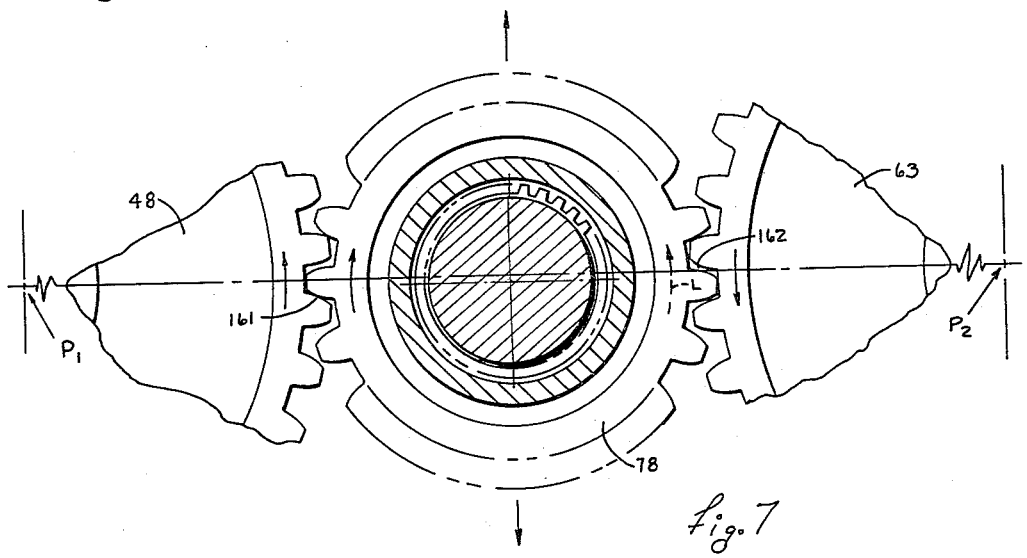
FIGURE 7 is a diagrammatic fragment taken on the line VII—VII of FIGURE 2.

It will be apparent from inspection of said FIGURE 7, and bearing in mind that gear 78 is permitted to move freely in a vertical direction, that regardless of the pressure exerted on the gear 78 at the point 161, said load torque will impose a counterclockwise acting force on said gear 78 and thereby move the rightward side of said gear upwardly until the pressure at 162 equals the pressure at 161.

If the tendency toward an unbalance occurs in the opposite direction, then the load torque will move the gear 78 downwardly to bring it again into balance with the adjacent gears 48 and 63.

This movement, and the resulting balancing of forces applied at points 161 and 162 obtained thereby, will occur very rapidly so that there is no likelihood of any appreciable unbalance occurring between the forces at the opposite contact points 161 and 162. As long as said forces remain equal, and bearing in mind that the gears 48 and 63 are of the same diameter and rotating at the same speeds, both the torque and the horsepower transmitted through each of the countershaft gears 48 and 63 will at all times remain equal.

In the example above given, attention was directed toward the countershaft gears 48 and 63 and the main shaft gear 78 associated therewith. It will be apparent that the same effects will be obtained regardless of which of the gear sets is clutched.

It will be recognized that the foregoing described operation effects a slight angular movement of the axis of the main shaft 72 with respect to the axis of the gear 131. However, the clearance provided between the external splining on the driver 134 and the internal splining on the gear 131 as above described is sufficient to permit such angular movement for the purposes herein required.

In the foregoing discussion with respect to both the construction and operation of the embodiment chosen to illustrate the invention, it has been assumed that the mountings of the bearings 73 and 74 are such as to permit only vertical movement of said bearings with respect to the remainder of the apparatus. It will be appreciated that under any but extremely accurate conditions of manufacture, there will necessarily be permitted some side-play but this will have no disadvantageous effect on the functioning of the apparatus as above described providing only that the sideward movement of the main shaft gears is held within sufficiently small limits that such sideward movement does not permit binding of the teeth of the main shaft gear and whichever one of the auxiliary gears a given main shaft gear moves toward at a given time.

The vertical motion required to permit the gear 131 to remain properly balanced between the auxiliary countershaft gears 57 and 69 is provided by the vertically resilient mounting of the bearing 74. Because of the floating relationship between the gear 131 and the adjacent countershaft gears 57 and 69, it is not necessary to have a floating relationship between the gear 144 and the adjacent countershaft gears 58 and 71. Thus, the shaft 136 and the gear 144 mounted rotatably thereon may be fixed solidly in the bearings 139 and 141 to hold same firmly against any lateral movement.

Thus, it will be observed that both the main gear group and the auxiliary gear group have in shifted condition one pair of auxiliary gears and a third gear held therebetween which are all three solidly mounted and held against lateral movement and one pair of gears and a third gear held therebetween wherein the central gear is floating. Specifically, in any shifted position of the transmission, the power train through the main transmission section will include one of the floatable main shaft gears 78, 83, 87, 91 or 94 and in the reduction position of the auxiliary section, the power train will include the floatable gear 131. Thus, the torque will remain equally divided between the countershafts in any shifted position, that is, in any position wherein either or both of the main or the auxiliary pairs of the countershafts are utilized, and the objects of the invention will be accomplished.

While the auxiliary countershafts are here shown as coaxial with the main countershafts, it will be recognized that this is a matter of design convenience only. Where two countershafts are used for both the main gear group and the auxiliary gear group, the auxiliary countershafts will be placed in the same plane as shown in order to permit both the clutched one of the main drive gears and the gear 131 to move between the countershaft gears, both main and auxiliary, in a direction perpendicular to said plane, but it will be recognized that said auxiliary countershafts may be placed at a different distance from the axis of said main shaft than the main countershaft. Where more countershafts than two are used, the same broad principles apply providing only that the countershafts are arranged symmetrically about the axis of the main shaft.

For convenience throughout the foregoing discussion it has been assumed that the torque loads in both countershafts are exactly equal. As a matter of accuracy it should be noted that this would be strictly true only if the main shaft and the main shaft gears had no weight or if their weight were compensated by a suitable spring arrangement. However, the discrepancy is of insufficient magnitude to be significant and it can be ignored as compared with the total tooth loading.

The particular speed ratios and manner of shifting same herein represent any desired gearing and ratio arrangement and accordingly need no detailing.

While the foregoing discussion has assumed for convenience of illustration that the power input is on the shaft 41 and the output is at the shaft 136 (or the shaft 72 insofar as the main box is concerned), it will be understood that the system will operate effectively and within the scope of the invention regardless of the specific location of the input and output connections provided only that the power flow goes in one direction or the other through whichever of the floating gears is clutched to the shaft 72 at a given time. This follows from the floating character of said last-named shaft. Thus, for example, the power input may be applied directly to only a single countershaft in which case the gear 42 will function as an idler to divide the power and apply it equally to each side of whichever gear is at a given time clutched to shaft 72; the power may be applied unequally but directly to both countershafts in which case the power will still divide through the gear 42 and appear equally on each side of whichever gear is at a given time clutched to shaft 72; or the power may be applied directly and equally to the countershafts in which case the gear 42 may be omitted so long as the countershafts remain rotationally interlocked through other means, such as the power source.

Alternatively, the power input may be on the shaft 72 and the driven load applied either to the shaft 41 or to either or both (equally or unequally) of the countershafts. Thus, a braking device may be applied to either or both of the countershafts without appreciably unbalancing the load on each side of the clutched main shaft gear, provided that a driving torque remains on the shaft 72 and the gear 42 is substantially free to idle. An example of this is where a retarder to resist vehicle momentum is driven from a single countershaft in a transmission embodying the invention.

If the input is at the shaft 41 and the output load is on the shaft 72, a further load or loads, as one or more power take-off devices, may be applied to either or both of the countershafts, equally or unequally, and still without unbalancing the power applied to each side of the clutched main shaft gear. In such case, assuming the power take-off to be attached to only one countershaft, the power required for the shaft 72 will flow equally thereto through the countershafts while the power required for the power take-off will flow through the countershaft to which it is connected without disturbing the equality of power flow to the shaft 72.

Other permutations, arrangements and uses within the principles above described will be apparent in the light of the foregoing and will be recognized as within the scope of the invention.

Although a particular preferred embodiment of the invention has been disclosed above for illustrative purposes, it will be understood that variations or modifications thereof which lie within the scope of the appended claims are fully contemplated.

What is claimed is:

1. In a change-gear system, the combination comprising:
    a housing;
    at least two spaced countershafts having parallel axes and mounted for rotation within said housing, said countershafts being held against movement other than rotative with respect to said housing;
    a plurality of groups of gears on said countershafts, each group being comprised of substantially identical countershaft gears on said countershafts;
    means for supplying input power to each of said countershafts;
    a driven gear driveable from each group of said countershaft gears;
    output means for said transmission;
    means supporting said output means for movement with respect to said countershafts in a direction substantially perpendicular to a plane including a pair of countershaft axes;
    means for selectively clutching said output means to one of said driven gears for selectively establishing a driving relationship from said countershafts through one group of countershaft gears, thence to and through the driven gear driveable from said one group for effecting driving of said output means.

2. In a change-gear system, the combination comprising:
    a housing;
    a pair of spaced countershafts having parallel axes and mounted for rotation within said housing, said countershafts being held against movement other than rotative with respect to said housing;

a plurality of countershaft ratio gears on said countershafts, the gears on one countershaft being paired with oppositely arranged gears on another countershaft to define gear groups; means for supplying input power to each of said countershafts;

driven gear means driveable from said countershaft driven gear groups and having its axis substantially in a plane defined by the axes of said two countershafts;

output means for said transmission;

means supporting said output means for movement with respect to said countershafts in a direction substantially perpendicular to said plane; and means for selectively clutching said output means to said driven gear means for thereby effecting driving of said output means from one of said pairs of countershaft gears at a time.

3. The device defined in claim 2 wherein said output means is a main shaft having its axis lying substantially within said plane, said main shaft being driveable from said driven gear means and wherein said supporting means are bearings which are movable with respect to said housing in a direction perpendicular to said plane.

4. The device defined in claim 3 wherein said driven gear means is mounted on said main shaft for movement transverse to the axis thereof and for rotation with respect thereto and means for selectively clutching said driven gear means with said main shaft upon relative axial movement between said driven gear means and said main shaft.

5. In a transmission the combination comprising:
a housing;
two spaced countershafts arranged parallel with respect to each other and supported for rotative movement within said housing;
input means simultaneously driving said countershafts in a substantially equal ratio relationship with respect to each other;
countershaft gears arranged each respectively on one of said countershafts;
a driven gear arranged between and in mesh with said countershaft gears and having its axis substantially parallel with the axes of said countershafts;
a main shaft arranged parallel with said countershafts and extending concentrically through said driven gear, said main shaft being clutchable for rotation with said driven gear;
bearing means supporting said main shaft and means supporting said bearing means with respect to said housing and permitting movement of said main shaft with respect to said housing in the direction perpendicular to a plane extending through the axes of two countershafts;
load-engaging means driven by said main shaft.

6. The device defined in claim 5 wherein said main shaft and said load-engaging means are arranged for limited angular movement of their respective axes with respect to each other.

7. The devices defined in claim 6 wherein the main shaft can move with respect to said plane so that its axis makes varying angles with said plane without impairing the driving relationship between said main shaft and said load-engaging means.

8. In a transmission the combination comprising:
a housing;
an input shaft;
a pair of main countershafts spaced from each other and arranged for fixed ratio-driving relationship from and by said input shaft;
means fixing said main countershafts within said housing for rotational relationship therewith;
a pair of auxiliary countershafts and means fixing said auxiliary countershafts for rotational relationship with respect to said housing and having their axes generally parallel to each other and parallel to the axes of said main countershafts;
an output shaft and bearing means fixing said output shaft in rotational relationship with said housing;
output gear means driven from said auxiliary countershafts;
a plurality of countershaft driven gears on said main countershafts, corresponding gears on each of said main countershafts being paired with each other;
a plurality of main drive gears each arranged between and meshed with a pair of corresponding countershaft driven gears and having their axes in a common line and said line being located substantially within a plane defined by the axes of said main countershafts, said main drive gears each having openings concentrically therethrough;
a main shaft extending through the openings in said main drive gears and clutchable with a selected one of said main drive gears;
means supporting said main shaft and arranged for floating relationship with said housing and permitting movement of said main shaft in a direction perpendicular to said plane;
means constantly driving said auxiliary countershafts from said main shaft;
means selectively clutching one of said main drive gears to said main shaft and means for alternately clutching said output shaft with either said main shaft or said output gear means;
whereby the input and output shafts of said transmission are firmly mounted against radial movement with respect to said housing and the main shaft extending therebetween is floatable with respect to said housing.

9. In a combined main and auxiliary gear group arrangement, each utilizing double countershafts, the combination comprising:
a main housing and an auxiliary housing arranged rigidly with respect to each other, an input shaft mounted rotatably at the input end of the main housing and supported against radial movement; an output shaft mounted rotatably at the output end of the auxiliary housing and supported against radial movement;
a main shaft mounted rotatably with said main housing and supported for limited radial movement with respect to said housings;
a pair of spaced main countershafts arranged rotatably within said main housing and held against radial movement with respect to said main housing;
means transmitting power from said input shaft to said main countershafts; a plurality of main countershaft gears on said main countershafts, said main countershaft gears being arranged thereon in pairs of identical gears;
main ratio gears held respectively between and on respective pairs of said main countershaft gears, said main ratio gears encircling said main shaft and being selectively clutchable thereto;
a pair of auxiliary countershafts arranged on opposite sides of said output shaft and means including an output driving gear transmitting power from said auxiliary countershafts to said output shaft;
a pair of auxiliary countershaft gears on said auxiliary countershafts and arranged oppositely with respect to each other and an auxiliary driving gear held between and on said last-named pair of gears, said auxiliary driving gear being driveable from said main shaft;
means alternately connecting said ouput shaft to either said main shaft or said output driving gear, whereby in shifted position of said transmission, the power train through each of said main gear group and said auxiliary gear group will include a radially floatable main ratio gear arranged between and held by the main countershaft gears.

10. The structure defined in claim 9 wherein the main shaft extends into the auxiliary housing and the auxiliary driving gear encircles and is rotatably connected with said main shaft.

11. The structure defined in claim 10 wherein the main shaft can rock within the auxiliary driving gear so that its axis can assume varying angles with respect to the axis of the auxiliary driving gear.

12. In a change gear system, the combination comprising:
   a plurality of spaced countershafts having parallel axes and means supporting said countershafts for rotation;
   substantially identical countershaft gears mounted on said countershafts;
   means for rotating said countershafts;
   a rotatable main shaft arranged parallel with said countershafts and located therebetween;
   means supporting said main shaft for movement with respect to said countershafts in a direction transverse through any plane which includes the axes of two of said countershafts; and
   drive gear means mounted on said main shaft and adapted for simultaneous meshing engagement with the countershaft gears.

13. A change gear system as defined in claim 12 including a housing;
   said countershafts being rotatably supported on said housing and being held against radial movement with respect thereto;
   said means supporting said main shaft including bearing means encircling and rotatably engaging said main shaft, said bearing means being mounted on said housing for movement in any direction transverse through a plane which includes the axes of two of said countershafts.

14. A change gear system according to claim 13 including resilient means for urging said bearing means into a position where said main shaft is centered between said countershafts.

15. In a change gear system, the combination comprising:
   a plurality of spaced countershafts having parallel axes and means supporting said countershafts for rotation;
   substantially identical countershaft gear means mounted on said countershafts;
   means for rotating said countershafts at substantially identical speeds and in the same direction;
   a rotatable main shaft arranged substantially parallel with said countershafts and located therebetween;
   means supporting said main shaft for movement with respect to said countershafts in a direction transverse to any plane which includes the axes of two of said countershafts;
   drive gear means encircling the axis of said main shaft and being free to float with respect thereto, said drive gear means being meshed with said countershaft gears and being supported thereby for movement with respect to said main shaft;
   and means for clutching said drive gear means to said main shaft.

16. A change gear system according to claim 15 wherein said drive gear means has a central opening through which the main shaft extends, said central opening being larger than the diameter of said main shaft so that said drive gear means is free to float with respect thereto.

17. A change gear system according to claim 15 wherein said countershaft gear means includes a plurality of sets of substantially identical countershaft gears mounted on the countershafts and said drive gear means includes a plurality of drive gears, each drive gear being meshed with and being supported by one set of countershaft gears;
   each drive gear having a central opening through which the main shaft extends, said central openings being larger than the diameter of the main shaft to provide an appreciable space therebetween so that said drive gears are free to float with respect thereto; and
   said clutching means being associated with each drive gear for selectively clutching same to said main shaft.

18. A change gear system according to claim 17 including an auxiliary transmission having an output shaft and a plurality of auxiliary countershafts around said output shaft, output drive gear means on said output shaft and substantially identical gears mounted on said auxiliary countershafts and adapted to be meshed with said output drive gear means; and
   a further gear movable angularly with respect to the axis of said main shaft for transmitting power from said main shaft to said auxiliary countershafts.

19. A change gear system according to claim 18 including means for selectively clutching said output shaft to said main shaft and to said output drive gear means.

20. A transmission which comprises: a housing;
   an input shaft rotatably supported by said housing;
   a plurality of countershafts rotatably supported by the housing;
   a drive gear mounted on said input shaft;
   identical first gears mounted on said countershafts and meshing with said drive gear whereby said countershafts may be driven at equal speeds;
   a plurality of sets of substantially identical countershaft gears mounted on said countershafts;
   a main shaft disposed between said countershafts substantially coaxial with said input shaft;
   driven gears encircling said main shaft and each thereof meshed with and being supported by one set of countershaft gears;
   means supporting said main shaft for movement in a direction transverse to a plane which include the axes of two countershafts, one end of said main shaft extending close to but being spaced from said drive gear and being free to move in said direction with respect thereto; and
   means for selectively clutching said main shaft to one of said driven gears at a time.

21. A combined main and auxiliary transmission which comprises:
   a housing;
   a main transmission including a main shaft and gear means for driving said main shaft at selectable speeds;
   means supporting said main shaft for rotation and for movement with respect to said housing transverse to the lengthwise extent of said main shaft;
   an auxiliary transmission including a plurality of countershafts and an output shaft adapted to be driven thereby, a gear mounted for rocking movement with respect to said main shaft and means for driving said gear from said main shaft; and
   means for translating rotation of said gear into rotation of said countershafts.

22. A transmission according to claim 21 wherein said means supporting said main shaft for rotation includes bearing means rotatably encircling said main shaft, said bearing means being mounted in said housing for movement transverse to the axis of said main shaft;
   said gear being sleeved over said main shaft and being located adjacent said bearing means whereby said gear may move transverse to the axis of said main shaft.

23. In a change gear system, the combination comprising:
   a plurality of spaced countershafts having parallel axes and means supporting said countershafts for rotation;
   countershaft gears mounted on said countershafts;
   a rotatable shaft arranged substantially parallel with said countershafts and located therebetween;
   means supporting said rotatable shaft for movement with respect to said countershafts along a line which passes transversely through a plane which includes the axes of two of said countershafts;

a rotatable gear encircling said rotatable shaft and being free to float radially with respect to said rotatable shaft, said rotatable gear being meshed simultaneously with countershaft gears on each of said plurality of countershafts and being normally supported thereby for both rotational and radial movement with respect to said rotatable shaft; and means for clutching said rotatable gear to said rotatable shaft.

24. A change gear system according to claim 23 wherein said means supporting said rotatable shaft includes resilient means for normally positioning said rotatable shaft in a substantially centered position wherein its axis lies at least substantially within said plane and concentric with said rotatable gear, said positioning facilitating clutching of said rotatable gear to said rotatable shaft and said resilient means permitting movement of said rotatable shaft along said line.

25. A change gear system according to claim 24 including positive guide means for limiting the movement of said rotatable shaft to movement along said line.

26. A change gear system according to claim 23 wherein said plurality of countershafts comprises: a pair of countershafts located on substantially diametrically opposite sides of said rotatable shaft.

27. A change gear system according to claim 23 wherein there is a pair of said countershafts located on substantially diametrically opposite sides of the rotatable shaft;

wherein a plurality of countershaft gears is mounted upon each of said pair of countershafts; and wherein there is a plurality of rotatable gears encircling said rotatable shaft, each rotatable gear being meshed simultaneously with a countershaft gear on each of said pair of countershafts.

28. A change gear system according to claim 24 wherein two countershafts are located on substantially diametrically opposite sides of the rotatable shaft;

wherein a plurality of countershaft gears is mounted upon each of said two countershafts; and wherein there is a plurality of rotatable gears encircling said rotatable shaft, each rotatable gear being meshed simultaneously with a countershaft gear on each of said two countershafts.

29. A change gear system according to claim 27 wherein said line of movement of said rotatable shaft is substantially perpendicular to the plane defined by the axes of said pair of countershafts.

30. A change gear system according to claim 23 wherein there is a pair of said countershafts substantially located on diametrically opposite sides of said rotatable shaft; and wherein said line of movement of said rotatable shaft is substantially perpendicular to the plane defined by the axes of said two countershafts.

31. A change gear system according to claim 27 wherein said clutching means includes engageable elements on said rotatable shaft and on each rotatable gear; and wherein at least certain of said engageable elements are relatively movable axially of said rotatable shaft to effect engagement and disengagement of said rotatable shaft with said rotatable gear, said rotatable gear remaining meshed with said countershaft gears during said axial movement.

32. In a change gear system, the combination comprising:

a plurality of spaced countershafts having parallel axes and means supporting said countershafts for rotation;

countershaft gears concentrically supported upon said countershafts;

a rotatable shaft arranged substantially parallel with said countershafts and located between a pair of said countershafts;

means supporting said rotatable shaft for movement with respect to said countershafts along a line which passes transversely through the plane which includes the axes of said pair of countershafts;

a rotatable gear encircling said rotatable shaft and being free to float radially with respect to said rotatable shaft, said rotatable gear being simultaneously meshed with countershaft gears on each of said countershafts and being supported thereby for rotational movement with respect to the rotational axis of said rotatable shaft; and clutching means for effecting a driving connection between said countershafts and said rotatable shaft through said countershaft gears and said rotatable gear.

33. A change gear system according to claim 32 wherein there is a pair of said countershafts located on substantially diametrically opposite sides of the rotatable shaft; and wherein a plurality of countershaft gears is mounted upon each of said countershafts; and wherein there is a plurality of rotatable gears encircling said rotatable shaft, each rotatable gear being meshed simultaneously with a countershaft gear on each of said pair of countershafts.

References Cited in the file of this patent

UNITED STATES PATENTS

| | | |
|---|---|---|
| 1,503,919 | Schmidt | Aug. 5, 1924 |
| 1,696,740 | Treschow | Dec. 25, 1928 |
| 1,981,236 | Logue | Nov. 20, 1934 |
| 2,995,046 | Mansachs | Aug. 8, 1961 |